Sept. 3, 1940.  J H. HUNT  2,213,813

METHOD OF MAKING FASTENERS

Filed Oct. 8, 1938

INVENTOR.
J HAROLD HUNT.
BY Carroll R. Taber
ATTORNEY.

Patented Sept. 3, 1940

2,213,813

UNITED STATES PATENT OFFICE 2,213,813

METHOD OF MAKING FASTENERS

J Harold Hunt, Lansing, Mich., assignor to Motor Wheel Corporation, Lansing, Mich., a corporation of Michigan Application October 8, 1938, Serial No. 233,913

1 Claim. (Cl. 10—10)

This invention relates to fasteners, and more particularly to a novel method of manufacturing headed screw threaded fasteners, such as bolts and cap screws.

In the past the usual method of making cap screws and bolts included the upsetting and flowing of one end of a metal bar into a die to form a solid head of the desired shape. Such a method is objectionable because of the many difficulties experienced in working the relatively large mass of metal in the head. The tremendous pressure required to shape the head makes the life of the forming dies extremely short. Furthermore, it is difficult to flow the metal into and properly fill the dies so as to produce smooth surfaces and good flow lines. The heads often require considerable finish machining. There is also a tendency for the dies to open up under pressure and allow the shanks of the screws to be distorted. Thus, uniform threads cannot be produced except by a cutting process, a very expensive procedure. The heads formed in the manner described cannot be hardened uniformly and they often have a tendency to check or crack.

This invention has for an object the provision of a method of making cap screws, bolts, and the like which eliminates the above mentioned difficulties. Another object is the provision of a method of making headed fasteners by which the cost of manufacture and the weight of the finished fasteners are considerably reduced.

The invention attains these objects and others which will become more apparent in the following specification, by means of a novel method of manufacture. Broadly, the invention comprises upsetting one end of a bar of metal to form a relatively thin flange, and thereafter flowing the outer edge portion or rim of this flange axially into the required head shape. The resulting head is hollow, eliminating excess metal, while the mass of metal to be worked is considerably reduced.

Figure 1:
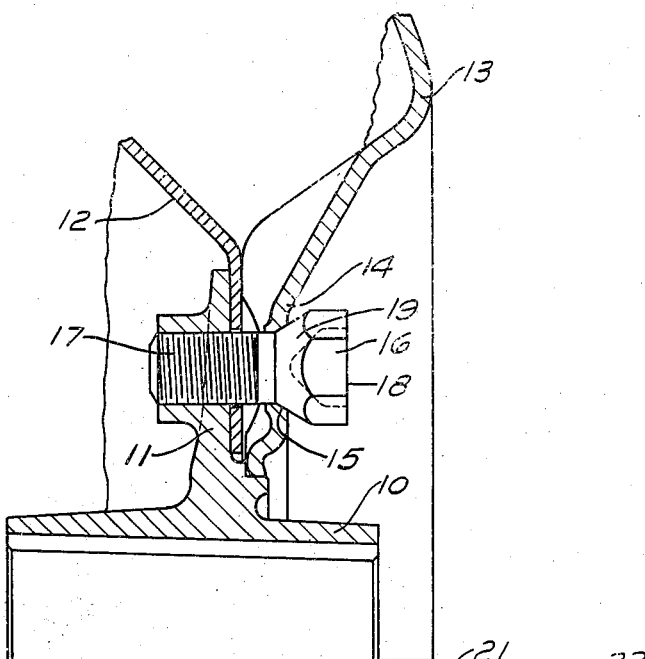
Figure 1 is a fragmentary cross-sectional view of a vehicle wheel embodying a cap screw made by this invention.

Figure 1 shows a common application of a fastener of the type which may be made by the method disclosed herein. The structure shown is a portion of a vehicle wheel of conventional construction. A hub 10 is provided with a radial hub flange 11 to which a brake drum 12 and a wheel body 13 are secured. The central or bolting on portion 14 of the wheel body 13 has an aperture 15 of conical shape which receives a cap screw 16. The cap screw has a threaded shank 17 which screws into an aperture in the hub flange 11. The head 18 of the cap screw has a conical surface 19 complementary to the conical surface in the apertures 15. The outer end of the head is of standard hexagonal shape to receive a wrench.

Figures 4, 5:
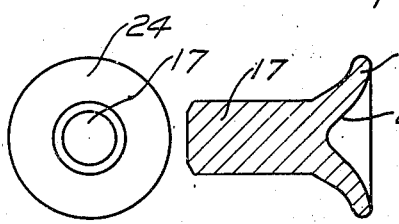
Figure 4 is a cross-sectional view of a blank formed in the dies of Figure 3.
Figure 5 is an end view of the blank shown in Figure 4.
Figure 3:
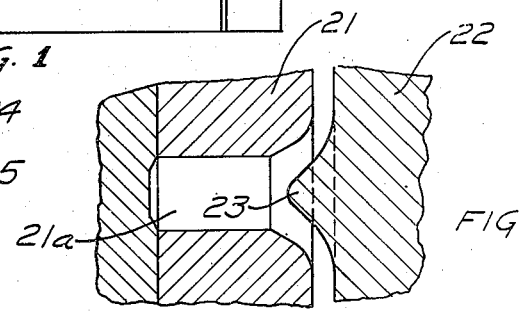
Figure 3 is a fragmentary cross sectional view of the dies used in the first step of the process.
Figure 2:
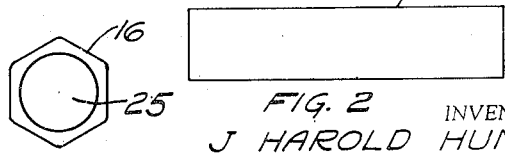
Figure 2 is a side elevation of a cylindrical bar of metal from which the cap screw is formed.

The cap screw is manufactured from a cylindrical bar of metal of the proper diameter and length. The original bar is shown at 20 in Figure 2. One end of the bar 20 is placed in a recess 21a in the female portion 21 of a forming die and the other end of the bar is subjected to pressure from the male member 22 of the die which is secured to a ram of a press (not shown). The part 22 of the die has a somewhat pointed boss 23. The bar is pressed between the two parts of the die which causes the metal of the bar to flow into the shape shown in Figures 4 and 5. The blank formed by this operation is shown in Figure 4 and consists of a shank 17 and an outwardly extending flange 24 forming a recess 25. This operation may be performed either on a hot or cold bar.

Figures 7, 8:
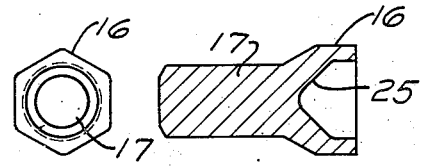
Figure 7 is a cross sectional view of the blank formed in the dies of Figure 6.
Figure 8 is an end view of the blank shown in Figure 7.
Figure 6:
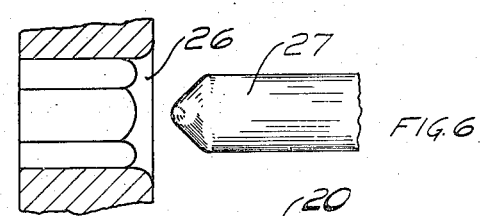
Figure 6 is a fragmentary cross-sectional view of the dies used in the second step of the process.
Figures 9, 10:
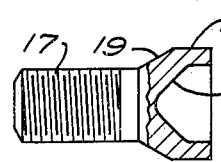
Figure 9 is a side view, partly in section, of a completed cap screw.
Figure 10 is an end view of the screw shown in Figure 9.

The blank illustrated in Figures 4 and 5 is next forced through a second tubular die 26 of hexagonal cross section. The shank 17 of the blank is inserted into the die first and the blank subjected to pressure from a punch 27 secured to the ram of a press (not shown) which forces it through the die. It will be obvious that the point of the punch 27 is of the same configuration and dimensions as the pointed extremity of the boss 23. The outer edge of the flange 24 is thereby caused to flow radially inwardly and axially away from the shank 17 whereby it takes the shape shown in Figures 7 and 8. The resulting blank is round shanked and has a hollow hexagonal head. If necessary the end of the head is then squared off, and the flats machined in any conventional manner. These operations, particularly the latter, are ordinarily not essential.

The final step consists of forming the threads in the shank. These may be prepared in any way desired, as by cutting or rolling. The various ways of forming threads are well known and need not be discussed here.

It will be evident from the foregoing that the resulting screw is lighter and cheaper than solid headed screws because of the reduced quantity of metal in the head. In addition, there is less metal to work, whereby the many difficulties previously experienced in manufacturing fasteners of the headed type are eliminated.

The scope of the invention is indicated in the appended claim.

I claim:

The method of manufacturing headed screw fasteners which consists in upsetting and axially indenting as a single operation of a pointed die one end of a cylindrical bar of metal to form a cup-shaped flange including a gradually tapering angularly disposed annular wall connected to the bar at its smaller end and terminating in a substantially radially extending rim at its larger end, forcing the rim through a polygonal die by a punch having a tapered point of substantially the same dimensions as the point of the first mentioned punch conforming to the interior configuration of the cup-shaped flange at the bottom portion thereof, as a single operation, to form a hollow head having a substantially axially disposed peripheral wall of substantially uniform thickness and polygonal exterior and a gradually tapering angularly disposed annular wall connecting the axially disposed peripheral wall to the bar, and finally grooving the remainder of the bar to form a threaded shank.

J HAROLD HUNT.